United States Patent

[11] 3,543,958

| [72] | Inventor | Donald M. Grey<br>Selma, California |
|---|---|---|
| [21] | Appl. No. | 828,908 |
| [22] | Filed | May 29, 1969 |
| [45] | Patented | Dec. 1, 1970 |
| [73] | Assignee | Sperry Rand Corporation<br>New Holland, Pennsylvania<br>a corporation of Delaware |

[54] CAPSTAN LIFT FOR A BALE WAGON BALE LOADER
6 Claims, 3 Drawing Figs.

[52] U.S. Cl. .................................................. 214/522;
254/150
[51] Int. Cl. .................................................. B60p 1/38

[50] Field of Search ..................................... 214/520,
521, 83.26, 85.5, 85.1; 254/150, 183

[56] References Cited
UNITED STATES PATENTS

| 3,341,039 | 9/1967 | Cranage ...................... | 214/522X |
| 3,448,848 | 6/1969 | Washburn ................... | 214/83.26X |

*Primary Examiner*—Albert J. Makay
*Attorney*—Joseph A. Brown, John C. Thompson, James J. Kennedy and George C. Bower

ABSTRACT: A capstan and lock mechanism for manually raising and lowering a bale wagon bale loader between an operable position and a transport position.

INVENTOR:
DONALD M. GREY

3,543,958

CAPSTAN LIFT FOR A BALE WAGON BALE LOADER

BACKGROUND OF THE INVENTION

It has been well known in the art to employ a hydraulic lift mechanism in combination with a bale wagon bale loader to raise and lower the loader between an operable, bale pickup position, and a raised transport position in which the loader is swung up onto the wagon receiving bed. These types of bale loader lift mechanisms have been shown in U.S. Pat. No. 2,848,127 issued to Grey on Aug. 19, 1958, and U.S. Pat. No. 3,367,522 issued to Grey et al. on Feb. 6, 1968.

While the hydraulic lift cylinder has performed its assigned function well, it has also tended to increase the cost of the bale wagon. The cylinders and valving necessary to lift the loader are not used often enough during normal operations to completely justify their inclusion.

The bale loaders are very heavy items and they are usually suspended from one side on the wagon. They must be raised up out of the way during transport of the wagon either by law or by necessity to permit the wagon to travel on a highway or to get through a fence or other type gate. Their weight nearly precludes complete manual lifting. Because of the weight of the loader and the ease with which the hydraulic cylinder operates, this type of lift system was found to be desirable in spite of the excessive costs involved. However, as the bale handling wagons have become more sophisticated by more complete automation through increased use of hydraulics, the cost fact begins to outweigh the desirability of the loader lift cylinder. Manufacturers have begun to look for alternative ways to accomplish the same function using a lift mechanism design offering ease of operation while still being inexpensive to manufacture and install.

SUMMARY OF THE INVENTION

Accordingly, therefore, the principle object of this invention is to provide an efficient, inexpensive, mechanical lift mechanism for a bale wagon bale loader.

Another object of this invention is to provide a lift mechanism which is easily operable from an operator's station remote from the bale loader.

A further object of the invention is to provide a bale loader lift mechanism using a flexible member and a capstan.

A still further object of the invention is to provide a lock mechanism cooperable with the capstan lift mechanism to positively retain the bale loader in the up, or transport position.

These and other objects of the invention will become apparent from the following description and appended claims.

DESCRIPTION OF THE PREFERRED EMBODIMENT

Figure 1:
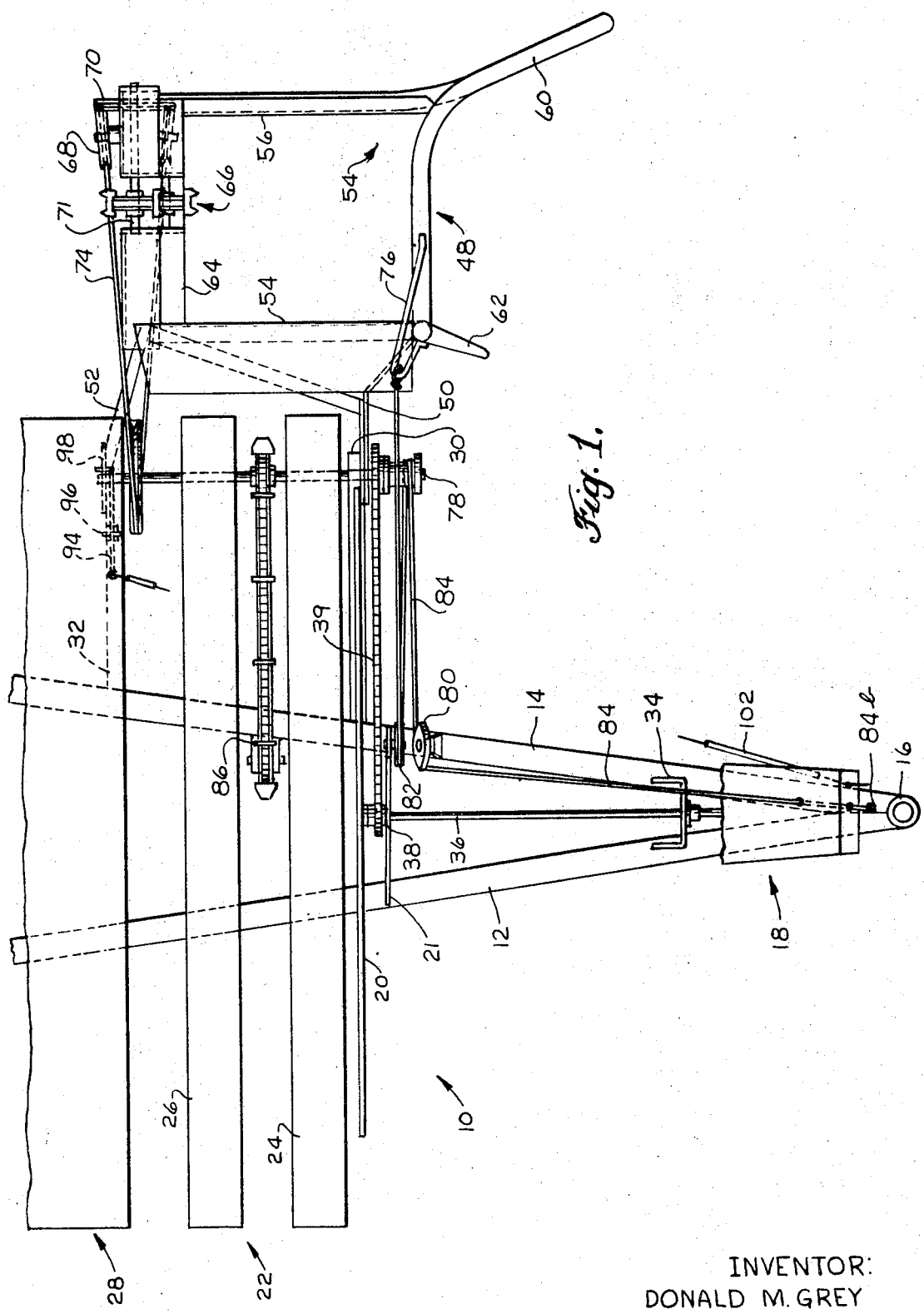
FIG. 1 is a diagrammatic plan view illustrating the application of the loader lift mechanism to the bale wagon.
Figure 2:
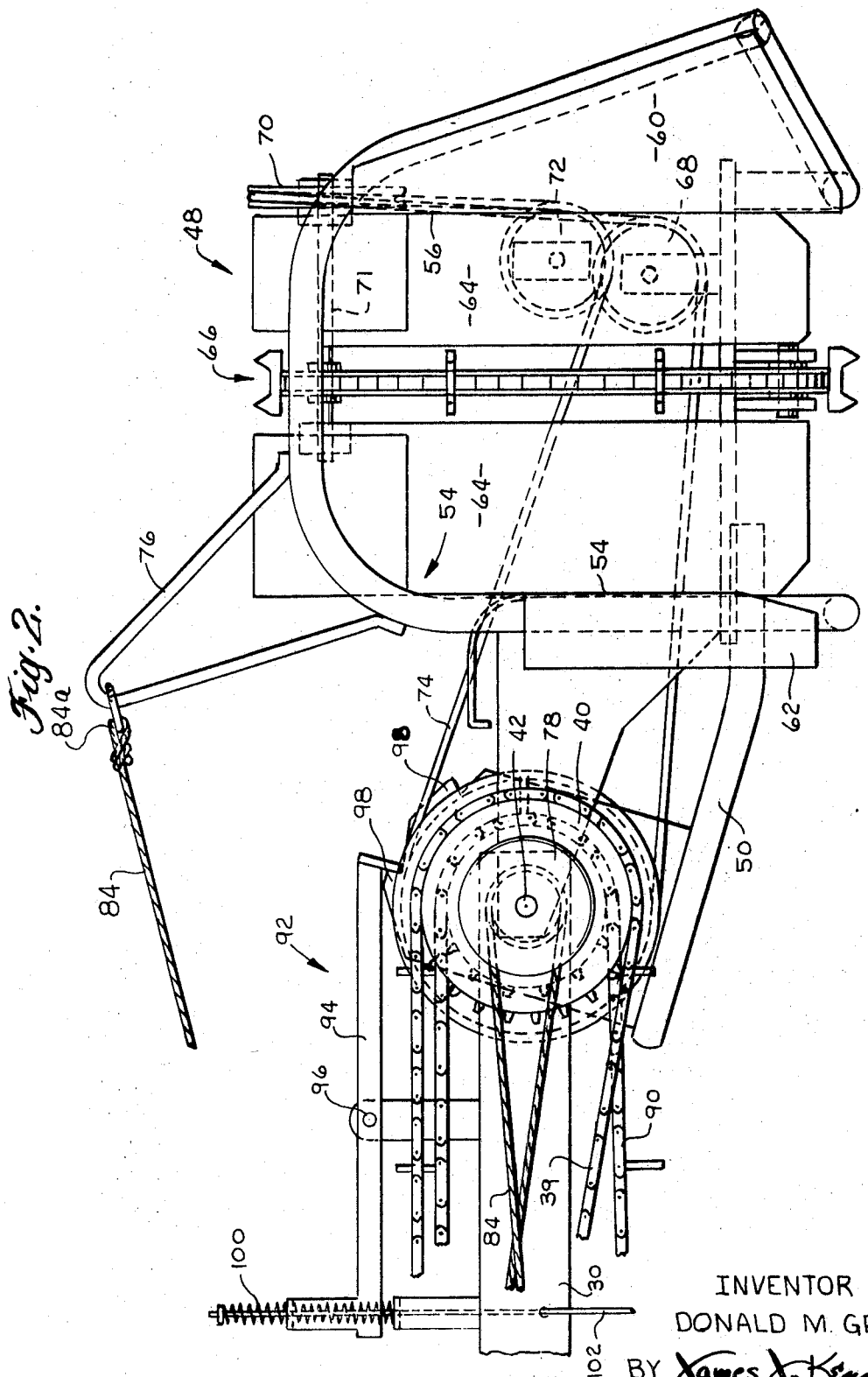
FIG. 2 is an enlarged front view of the pickup unit and the associated rope control.

Referring now to FIGS. 1 and 2, a forward portion 10 of a bale wagon chassis structure is provided with converging frame members 12 and 14 and a hitch portion 16, adapting the wagon to be connected to a tractor, or similar vehicle, not shown, for movement over the ground. A control console 18, shown broken away in FIG. 1, extends upward from the chassis structure to an area adjacent the tractor operator's station. The various control levers for the wagon operation terminate there.

Mounted rearwardly on the frame members 12 and 14 is a front guide sheet or panel 20 for a receiving bed 22 and an upstanding wall 21. The receiving bed 22 is comprised of a pair of transversely extending rails 24 and 26 and is pivotally mounted with respect to the chassis structure. Disposed further rearwardly on the wagon chassis is a transfer bed 28 upon which bales delivered by the receiving bed are further accumulated to form a plurality of bales unto a bale tier of eight or more bales.

Figure 3:
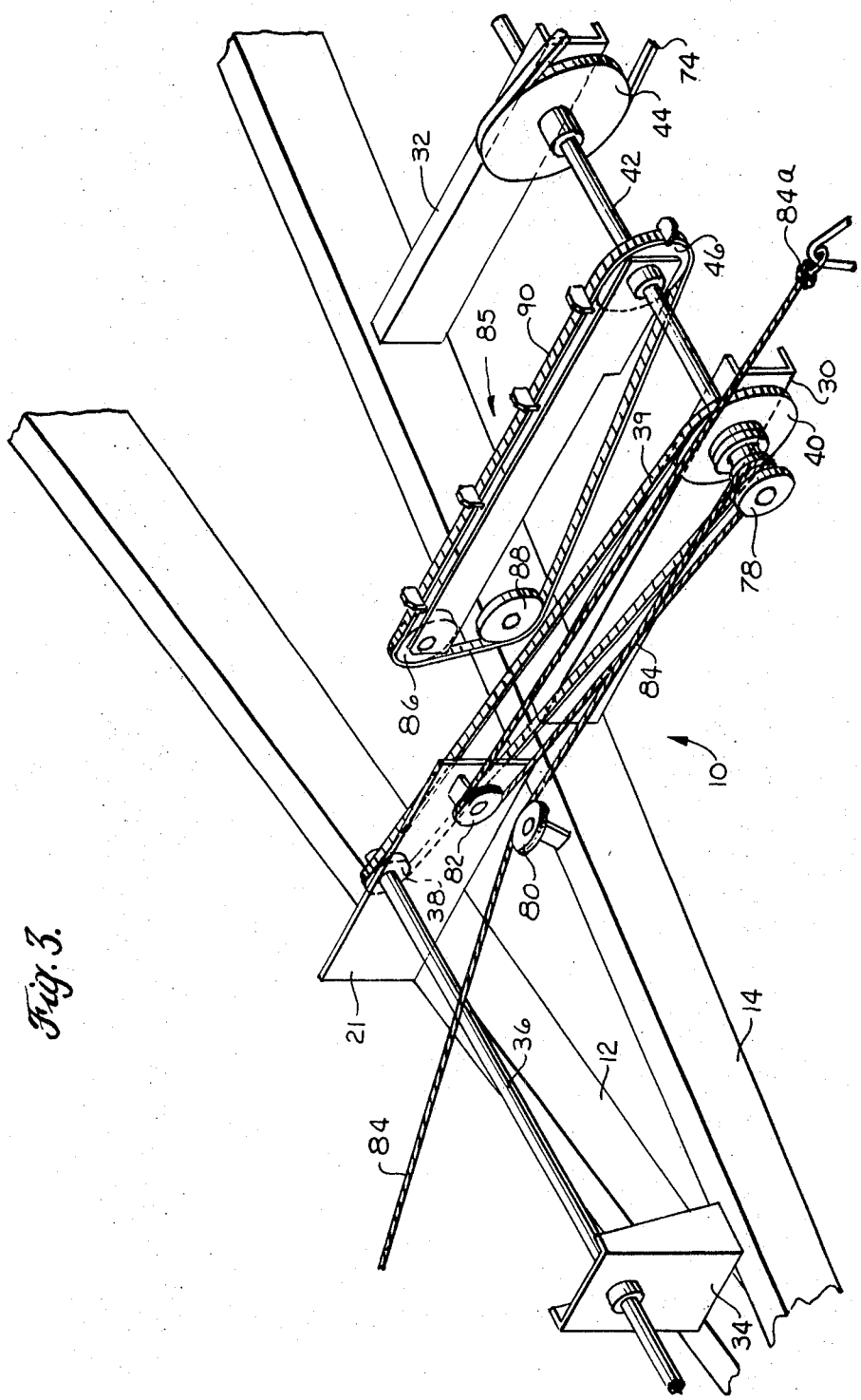
FIG. 3 is a schematic isometric view illustrating the drive system.

A pair of spaced-apart, transversely-extending frame members 30 and 32 are suitably fixed to frame member 14, as shown in FIGS. 1 and 2. A U-shaped bracket 34 is fixed to the converging frame members 12 and 14 adjacent the forward end thereof and extends upwardly from the chassis. The bracket 34 supports one end of a rotatable PTO shaft 36. The other end of the shaft is suitable supported in plate 21. A sprocket 38 is mounted at the inward end of shaft 36, as shown in FIGS. 1 and 2, and is drivingly connected by endless chain 39 to a driven sprocket 40. The sprocket 40 drives a horizontally extending shaft 42 which is suitably rotatably supported by the transverse frame members 30 and 32. A sheave 44 is fixed to the shaft 42, as shown in FIG. 3. Another driven sprocket 46 is fixed to the shaft 42 intermediate the ends thereof.

A pickup, or bale loader, 48 is disposed at one side of the bale wagon, being pivotally mounted to the chassis structure thereof by mounting arms 50 and 52. The loader is comprised of a U-shaped, forwardly opening frame structure 54, side panels 56 and 58, forwardly extending guides 60 and 62, rear wall 64 and elevating means 66. Driving connection between the shaft 42 and the bale loader elevating means 66 is provided by sheaves 68 and 70, shaft 71, sheave 72 and endless belt 74 which extends between sheave 44 and the sheaves on the loader.

A U-shaped bar 76 is fixed to frame structure 54 at the forward upper end thereof.

A capstan 78 is suitably fixed to the other end of shaft 42 for rotation therewith as shown in FIGS. 1—3. A pair of pulleys 80 and 82 are fixed to frame member 14 and wall 21, respectively. A flexible rope, or cable 84, having ends 84a and 84b, extends around the pulleys 80 and 82 and capstan 78. End 84a of cable 84 is fixed to the U-shaped bar 76 on the bale loader, while the other end 84b extends upwardly to the control console, terminating within easy reach of the operator from his station.

A cross conveyor 85 is provided on the receiving bed 22 and is comprised of idlers 86 and 88, drive sprocket 46 and endless chain 90. The bale loader, the cross conveyor and the capstan are all driven by the same horizontal shaft 42 from the PTO shaft 36.

A lock mechanism 92, to insure that the bale loader remains in a raised transport position once it is lifted, is comprised of a lever 94 which is pivotally mounted at 96, intermediate the ends thereof, a plurality of spaced-apart stop members 98 on the bale loader lift arm, a spring 100 extending between the lever and the chassis to bias the lever into engagement with the stops, and a cable 102 which extends between the lever and the control console.

In normal operation, the bale loader on a bale wagon is in the position shown in FIG. 2. Bales are picked up from the field by the bale loader, being raised by elevating means 66, and successively delivered to the receiving table. The cross conveyor on the receiving table directs bales across the receiving bed until the requisite number of bales are accumulated there, whereupon the receiving bed pivots upwardly delivering the bales to the transfer bed. The transfer bed accumulates eight or more bales and delivers them to a load bed (not shown) where they are stacked in vertically extending tiers. Once the wagon is completely filled with bales, the wagon drives, or is driven from the field to an unloading area and returns. In so doing, it is desirable to lift the bale loader from the laterally extending operating position to a raised transport position (not shown) by pivoting the loader about the inward ends of the mounting arms 50 and 52. To do this, the operator pulls the cable 84, drawing it tight around the capstan. As the cable is drawn tight, the loader is lifted upwardly to the desired position. At the same time, lever 94 of the lock mechanism rides over the stops 98 to engage the next stop and prevent the loader from moving back to the operable position upon release of the cable on the capstan. Once the loader assumes the transport position, with the loader folded back on the receiving table, the lock mechanism has engaged one of the stops and the tension on cable 84 may be relaxed. In so doing, the cable is now only loosely wound around the capstan and it is free to slip relative thereto.

When the operator desires to lower the loader back to the operable position, he merely grasps the cable 84 at his station and pulls cable 102, causing the lever to pivot upwardly about point 96, so that the lever is disengaged from the stops 98 and the loader is free to be lowered by gravity back to its operating position.

While this invention has been described in connection with a single embodiment, it will be understood that this embodiment is capable of modification and that this application is intended to cover any variation, uses, or adaptations following, in general, the principles of the invention and including such departures from the present disclosure as come within known or customary practice in the art to which the invention pertains, and as fall within the scope of the invention or the limits of the appended claims.

We claim:

1. In a bale wagon having a chassis structure, bed means on said chassis structure for receiving and accumulating bales thereon, a bale loader pivotally mounted on said chassis structure for picking up bales from a field and loading the bales on said bed means, a conveyor on said bed means transferring bales from said bale loader to said bed means, and means for driving said conveyor, the improvement comprising: means on said bale wagon for pivoting said bale loader between an operating position and a transport position comprising a capstan supported by said chassis structure, means connecting said capstan in driving relation to said conveyor driving means and flexible means having first and second ends, said first end being connected to said bale loader and extending around said capstan, said second end extending to an operator's station for selective operation of said capstan for pivoting said bale loader whereby when said flexible means is wrapped tightly around said capstan said loader will be pivoted upwardly to said transport position and when said flexible means is wrapped loosely around said capstan said flexible means will slip relative to the capstan.

2. A bale wagon improvement, as recited in claim 1, wherein said conveyor means, said bale loader and said capstan are driven from a single shaft rotatably supported by said chassis structure and a lock means is operably connected to said bale loader to retain said loader in the raised transport position.

3. A bale wagon improvement, as recited in claim 2, wherein said lock means comprises a plurality of spaced-apart stops on said bale loader, a pivotal lever biased into engagement with said stops and means for pivoting said lever to releasing engagement of said lever and said stops to lower said loader to said operable position.

4. In a bale wagon having a chassis structure, bed means on said chassis structure for receiving and accumulating bales thereon, a bale loader pivotally mounted on said chassis structure at one side thereof for picking up bales from a field and loading the bales on said bed means, a cross conveyor on said bed means for transferring bales from said bale loader to said bed means, drive shaft means for driving said cross conveyor and said bale loader, and means for raising and lowering said bale loader with respect to said chassis comprising a capstan mounted on said drive shaft means for movement therewith, and cable means having a first end connected to said bale loader, an intermediate portion extending around said capstan and a second end extending to an operator's station for selectively raising and lowering said bale loader whereby when said cable is loosely wrapped around said capstan said cable will slip relative thereto and when said cable is tightly wrapped around said capstan said loader is raised.

5. In a bale wagon, as recited in claim 4, wherein a lock mechanism is engageable with said loader to retain said loader in a raised transport position.

6. In a bale wagon, as recited in claim 5, wherein said lock mechanism comprises a lever pivotally mounted on said chassis, a plurality of spaced-apart stops on said bale loader engageable with said lever, means for biasing said lever into engagement with said stops and means operably connected to said lever to release said lever from engagement with said stops.